United States Patent
Freitas et al.

(10) Patent No.: US 10,565,158 B2
(45) Date of Patent: Feb. 18, 2020

(54) MULTI-DEVICE SYNCHRONIZATION FOR IMMERSIVE EXPERIENCES

(71) Applicant: Amazon Technologies, Inc., Seattle, WA (US)

(72) Inventors: Kevin Freitas, Seattle, WA (US); Charles Shearer Dorner, Seattle, WA (US); Alaa-Eddine Mendili, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 282 days.

(21) Appl. No.: 15/665,164

(22) Filed: Jul. 31, 2017

(65) Prior Publication Data
US 2019/0034380 A1    Jan. 31, 2019

(51) Int. Cl.
*G06F 15/173* (2006.01)
*G06F 15/16* (2006.01)
(Continued)

(52) U.S. Cl.
CPC .......... *G06F 15/16* (2013.01); *G06F 11/3006* (2013.01); *G06F 11/3051* (2013.01);
(Continued)

(58) Field of Classification Search
USPC ........................................................ 709/226
See application file for complete search history.

(56) References Cited

U.S. PATENT DOCUMENTS 8,205,004 B1 * 6/2012 Kaufman .............. H04L 65/607
 375/240
8,576,276 B2 * 11/2013 Bar-Zeev .............. G02B 27/017
 345/8

(Continued)

FOREIGN PATENT DOCUMENTS

| EP | 2713369 | 4/2014 |
| WO | 2017034886 | 3/2017 |

OTHER PUBLICATIONS

PCT/US2018/044073, "International Search Report and Written Opinion", dated Mar. 28, 2019, 11 pages.

*Primary Examiner* — Alicia Baturay
(74) *Attorney, Agent, or Firm* — Kilpatrick Townsend & Stockton LLP

(57) ABSTRACT

Techniques described herein include systems and methods for enhancing content consumption experiences by synchronizing one or more devices to add immersive environmental effects to an area. In embodiments, a database of device capabilities and device identifiers for a plurality of devices associated with a location may be maintained. Information may be obtained that identifies that a particular portion of content has been consumed. Metadata associated with the particular portion of content may be identified based at least in part on the information and the database. The metadata may comprise definitions for providing environmental stimuli to the location where the environmental stimuli may correspond to the particular portion of content. Environmental stimuli may be presented within the location by invoking (Continued)

application programming interface calls for a portion of devices of the plurality of devices based on identifying the metadata and the device identifiers for the portion of devices.

19 Claims, 9 Drawing Sheets

(51) Int. Cl.
    *G06F 11/30*       (2006.01)
    *G06F 16/27*       (2019.01)
    *G06F 16/438*     (2019.01)
    *G06F 16/48*       (2019.01)

(52) U.S. Cl.
    CPC .......... *G06F 16/27* (2019.01); *G06F 16/4393* (2019.01); *G06F 16/48* (2019.01)

(56) References Cited

U.S. PATENT DOCUMENTS

| | | | | |
|---|---|---|---|---|
| 9,323,057 B2* | 4/2016 | Dent | ....................... | G06F 3/038 |
| 9,699,494 B2* | 7/2017 | Dow | ..................... | G06F 13/385 |
| 9,747,723 B2* | 8/2017 | Gardes | ................. | G06T 19/006 |
| 9,833,698 B2* | 12/2017 | Haseltine | ................ | A63F 13/06 |
| 9,914,057 B2* | 3/2018 | Muhlheim | .............. | A63F 13/06 |
| 9,925,458 B2* | 3/2018 | Fateh | ...................... | A63F 13/26 |
| 9,925,549 B2* | 3/2018 | Fateh | .................... | B05B 7/2497 |
| 10,009,727 B1* | 6/2018 | Ledet | .................. | G06Q 30/0267 |
| 10,078,917 B1* | 9/2018 | Gaeta | ..................... | G06T 15/503 |
| 2003/0055867 A1* | 3/2003 | King | ................... | H04L 67/2861 |
| | | | | 709/201 |
| 2014/0298382 A1* | 10/2014 | Jo | ...................... | H04N 5/44582 |
| | | | | 725/34 |
| 2014/0298383 A1* | 10/2014 | Jo | ........................ | H04N 21/251 |
| | | | | 725/34 |
| 2014/0301645 A1* | 10/2014 | Mattila | .............. | G06K 9/00671 |
| | | | | 382/182 |
| 2014/0372540 A1* | 12/2014 | Libin | .................. | H04L 12/1822 |
| | | | | 709/206 |
| 2015/0123966 A1* | 5/2015 | Newman | ............... | G06T 19/006 |
| | | | | 345/419 |
| 2015/0149301 A1* | 5/2015 | Dow | .................. | G06Q 30/0276 |
| | | | | 705/14.69 |
| 2015/0302651 A1* | 10/2015 | Shpigelman | .......... | G06T 19/006 |
| | | | | 345/633 |
| 2015/0309973 A1* | 10/2015 | Brav | ...................... | G06F 16/35 |
| | | | | 715/256 |
| 2015/0309986 A1* | 10/2015 | Brav | ....................... | G06F 16/35 |
| | | | | 707/739 |
| 2016/0021325 A1* | 1/2016 | Porcar | ...................... | A61L 9/12 |
| | | | | 348/553 |
| 2016/0133230 A1* | 5/2016 | Daniels | ................ | G06T 19/006 |
| | | | | 345/633 |
| 2018/0286129 A1* | 10/2018 | Harviainen | ........... | G06F 3/1423 |

\* cited by examiner

MULTI-DEVICE SYNCHRONIZATION FOR IMMERSIVE EXPERIENCES

BACKGROUND

Households typically include a number of connected or smart devices that can be communicated with, wirelessly or otherwise, to perform utilitarian functions such as lock a door or turn on a light. More and more users are accepting smart and connected devices into their homes to perform some tasks more efficiently such as securing a home or ordering items. Users can also utilize user devices such as e-readers, mobile phones, or portable game devices to consume content such as by playing video games, reading a book, or watching a movie. However, when users interact with user devices to consume content they are often only experiencing a one dimensional content consumption experience. For example, when reading a book the user merely consumes the content by reading from the pages and turning said pages. The environment in which the user consumes the content is not affected by the content they are consuming.

BRIEF DESCRIPTION OF THE DRAWINGS

Various embodiments in accordance with the present disclosure will be described with reference to the drawings, in which.

DETAILED DESCRIPTION

Figure 1:
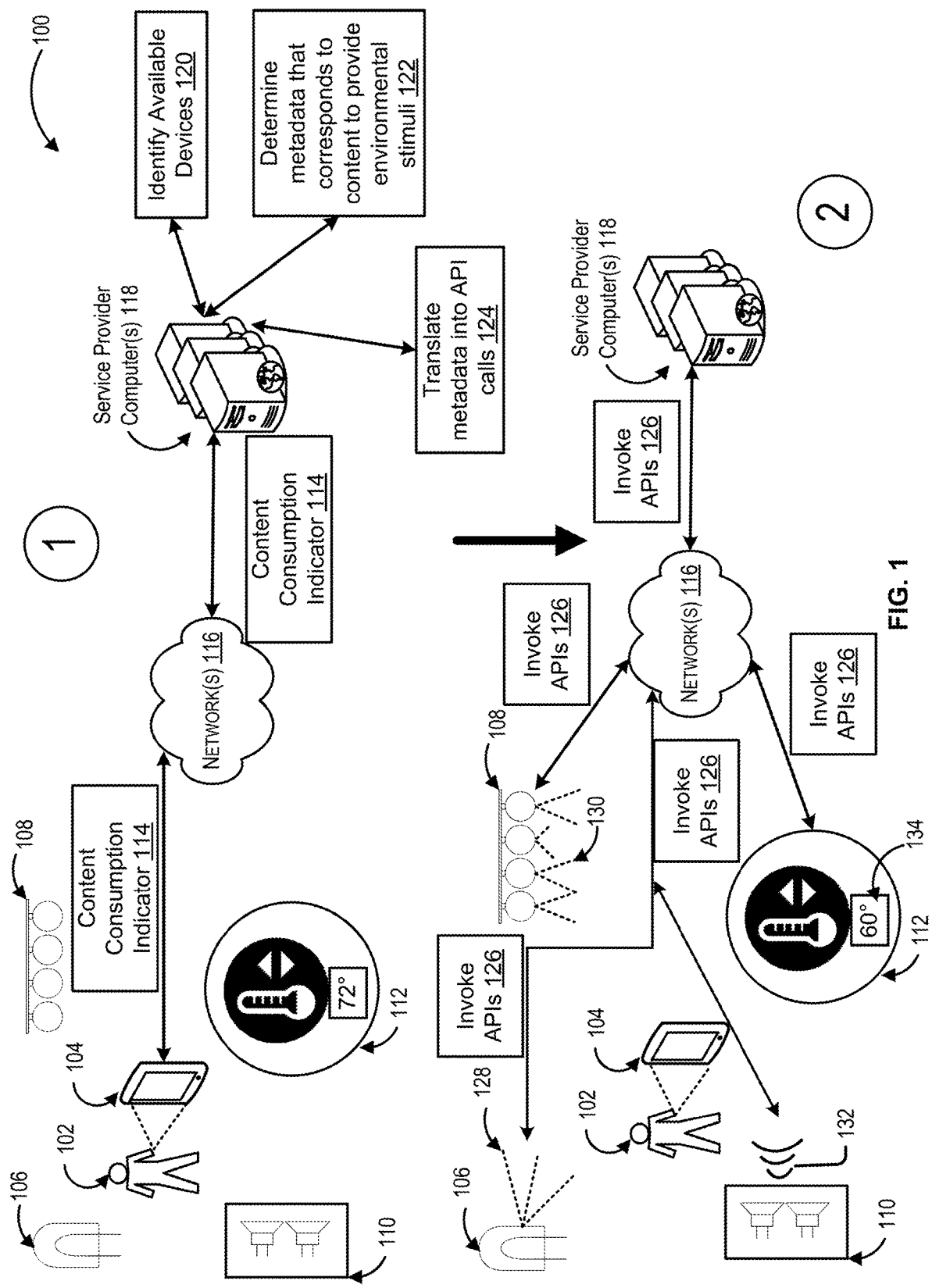
FIG. 1 illustrates an example workflow for a device synchronization feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods herein provide solutions for synchronizing devices within a certain area to provide environmental stimuli that corresponds to content being consumed by a user. In particular, as a user progresses through consuming content metadata associated with various sections of the content can be used to trigger interaction and/or activation of other smart and/or connected devices to provide environmental stimuli to a location associated with the user consuming said content. Smart and/or connected devices (e.g., devices capable of being communicated with by another device via wireless or wired connections to perform corresponding utilitarian functions) can be coordinated and synchronized to activate or perform said utilitarian function and provide environmental stimuli to an area and thus enhance the content consumption experience for the user with a device synchronization feature. For example, if a user is using an e-book reader to read about a character traveling through an artic frozen wasteland, metadata associated with this section of the story may include instructions for lowering the temperature of the room and activating lights to provide a dim blue light. In embodiments, an author of the content can specify metadata to associate with one or more sections or portions of the authored content that includes definitions for providing environmental stimuli to an area that corresponds to the section or portion of content being consumed. In embodiments, the metadata and definitions may include an action description as an extensible markup language (XML) instance which may include definitions for what elements each instance should contain.

A hub of smart, connected, or internet of things (IoT) devices can be utilized to discover, add, or remove devices to a user's local network or wireless personal area network that can be utilized to provide the environmental stimuli supposing that the metadata for content includes definitions for using said devices. In accordance with at least one embodiment, a user device consuming the content and/or a service provider computer implementing the device synchronization feature described herein may synchronize the devices similar to the hub described above. In embodiments, a user may interact with a user interface provided by the service provider computer and/or hub to add or remove devices and specify user preferences for utilizing metadata associated with content. For example, some metadata may include instructions for invoking services, such as services associated with an electronic marketplace, to time delivery of certain items to coincide with the section or portion of content consumed. To further illustrate the example, a user while consuming content via a user device, may be provided with a notification or message requesting permission to deliver a pizza to their location to coincide with a character in a movie eating pizza. Devices may be communicated with by invoking application programming interface (API) calls or programmatic interface calls that are configured to interact with smart, connected, or IoT devices and activate or cease function of the devices functions. In embodiments, the metadata may be translated into API calls or other programmable interface communications for activating devices to provide environmental stimuli to an area.

In some embodiments, the metadata may include instructions for retrieving additional content such as audio or video clips as well as definitions for specific ranges of luminosity, decibel levels, light dimness level, or temperature levels that correspond to the section or portion of content currently being progressed through or consumed by the user. In accordance with at least one embodiment, the metadata may be generated by an author of the content as well as other entities such as content providers, other users, or friends of users such that multiple sets of metadata can be associated with a single piece of content. Each set of metadata may represent a person's take on the metadata associated with the content such that a new environmental experience may be presented to a user as they progress through the same piece of content. The user may select the metadata they wish to apply, if available, to a piece of content prior to consuming the content. Environmental effects or stimuli may be invoked and presented to a user as they consume different types of content other than conventional media content such as television, movies, books, magazines, or video games. For example, advertisements, items offered by an electronic marketplace, news casts, sporting events and/or sporting events recaps or news compilations may each be associated with metadata that may trigger the invocation of connected device functions to provide the environmental effects or stimuli to an area around the user. To further illustrate the example, a user may view an item detail page for a yellow dress which causes metadata to be invoked that describes that the lights around the use should turn a hue of yellow.

In accordance with at least one embodiment, the service provider computer, hub, or user device may be in communication with a database that maintains and updates device capabilities and device identifiers. The device capabilities may be provided by manufacturers of the device or specified by users for connected devices by interacting with a user interface provided by the device synchronization feature as implemented by the service provider computer. In embodiments, metadata for content can be looked up or identified based on an identifier of the content. A content finger print operation can occur for certain types of media that do not have the metadata associated with the content itself (e.g., older DVDs, books, or audio books) such that the service can identify if metadata is available for the content and enhance the user's content consumption experience by providing environmental stimuli to the area. In embodiments, the user device may obtain and/or the hub or service provider computer may receive information or indications of progression through the content by the user. Some content types may include built in indicators of progression such as page numbers or time markers (time from beginning of content).

In some embodiments, information indicating that the user has interacted with the content via accessibility options such as zooming into content or accessing additional features can be utilized to determine the user's progression through the content. In embodiments, the service may determine a rate of progression for the user based on historical information about the user's progression through the type of content or it can be dynamically determined for the current piece of content being consumed. One or more thresholds may be maintained by the device synchronization service that are utilized to determine when a user has ceased to consume content which further causes cessation of providing the environmental stimuli to the area. For example, a user's progression through content may be compared to a threshold to determine that the user has stopped consuming content (put down an e-book) and thus environmental stimuli should cease being provided (invoke additional APIs to turn off lights and increase the temperature of the room to a previous temperature). In some embodiments, the user may provide input for use in determining that they have ceased consuming the content such as by hitting a pause button, switching applications (such as from a content consuming application to a different application), or turning off a device or otherwise indicating that power is no longer being provided to the device. In some embodiments, data from a user device that a user is utilizing to consume the content can be utilized to determine whether a user has ceased consuming the content. For example, accelerometer data of the user device may be utilized to identify a first position or angle of the user device that is associated with content consumption while another position or angle of the user device may be associated with no longer accessing or utilizing the user device (e.g., a first position or angle may represent the user device being at a vertical or certain angular position that corresponds to the device being used whereas a second position or angle may represent the user device at rest such as by lying flat on a surface). In embodiments, prior to invoking API calls or other communications to devices to provide environmental stimuli to an area, the device synchronization feature may record or obtain a current state of a device. For example, with a smart thermostat, the current temperature prior to any adjustments made as defined by the metadata may be maintained by the service such that when the content ceases to be consumed, a previous state of the devices can be restored. To further illustrate, upon ceasing to watch a movie the temperature of the room may rise to a previous temperature in response to the service invoking API calls that cause a smart thermostat to raise to a previous level prior to consuming the content.

As an illustrative use case, a user may be viewing a movie about an astronaut stranded on the planet Mars. As the user progresses through the movie, such as viewing a scene in which the astronaut seeks shelter in a tent like structure, metadata associated with the movie may include definitions for activating nearby speakers to provide howling wind noises as well as initiate a slow transition of lights to a hue of orange. In response to identifying that metadata corresponds to this particular scene of the movie, a hub of devices may identify available devices near the user, or devices connected to a wireless personal area network, and determine appropriate metadata to invoke for providing environmental stimuli. The hub may translate or received translated metadata into API calls for communicating and interacting with nearby speakers and track lights which cause the howling winds noises and orange hue light transition to be provided in the area around the user.

The processes and systems described herein may be an improvement on conventional environmental stimuli presentation methods and device synchronization techniques. For example, conventional environmental stimuli services include static devices and static device implementations to provide stimuli that lack awareness of nearby devices and/or particularity to a consumption rate provided by a user. Further, the methods described herein provide for various authors, such as the actual author of the content and friends of the user, to specify different metadata sets to associate with certain content such that a user may select and experience new environmental stimuli through each progression of the same content. The improvements described herein can invoke and implement dynamically identified devices for providing environmental stimuli that can take into account user preferences, available devices, and particular portions or sections of content being consumed by the user. By implementing the features described herein, a service may enhance the content consumption experience of the user by turning a one dimensional experience into a multi-dimensional experience that adds to the user's experience and does not distract the user with unintended or unwanted interruptions to the content consuming experience. Further, upon ceasing to consume the content, the services described herein can implement a return to a previous state by communicating with devices to return the devices to the previous state prior to implementing the metadata for the content.

FIG. 1 illustrates an example workflow for a device synchronization feature, in accordance with at least one embodiment. The workflow 100 of FIG. 1 depicts a user 102 interacting with a user device 104 to consume content, such as reading a book. An area or location within a certain distance of the user may be associated or include one or more devices, such as devices 106-112 that are either activated according to their normal utilitarian function, such as smart thermostat device 112 maintaining a first temperature, or inactive such as light devices 106 and speaker device 110. As used herein, a utilitarian function of a device includes the normal intended useful or practical function or capability of the device. In response to the user 102 progressing through the content presented by user device 104, a content consumption indicator 114 is transmitted, via networks 116, to service provider computers 118. The service provider computers 118 may implement the device synchronization features described herein. In embodiments, the content consumption indicator 114 can include markers or other indicators associated with the content such as page numbers, time logs or time stamps that identify time elapsed since the content began presentation, or other suitable information. In some embodiments, the content consumption indicator 114 can include information identifying that the user 102 has interacted with the content via the user device 104 such as by utilizing device capabilities like a zoom function or otherwise activated other accessibility options associated with the content. Consumption of content includes beginning consumption of content, engaging in consumption of content and ending consumption of content. Consumption of content includes presentation of content to a consumer or user, perception of content by a consumer or user and interaction with content by a consumer or user. The content consumption indicator 114 may indicate any suitable aspect of consumption.

The workflow 100 of FIG. 1 illustrates, at step 1, the service provider computer 118 identifying available devices at 120. As described herein, the service provider computer 118 may attempt to communicate with devices near the user device 104, such as devices 106-112, via ping or identification communications. In some embodiments, the service provider computer 118 may utilize input provided by user 102 and a user interface to identify the available devices that the user desires to be utilized when presenting environmental stimuli. In such cases, the service provider computer 118 may look up device identifiers for the available devices at 120. The workflow of FIG. 1 at step 1 depicts the service provider computers 118 determining metadata that corresponds to the content to provide environmental stimuli at 122. In embodiments, the service provider computers 118 may be configured to utilize the content, the available devices, and the content consumption indicator 114 to identify appropriate metadata that is associated with the current section or portion of content being consumed by the user 102. For example, certain sections or portions of content may be associated with metadata that defines environmental stimuli that corresponds to the subject matter, environment, or conditions of section or portion of content that an author deems appropriate for said section or portion of content. The service provider computers 118 may be configured to select the appropriate metadata from a set of metadata that is associated with the content to correspond to the particular section or portion of content currently being consumed by the user 102. For example, metadata that is associated with another portion or section of content should not be utilized as the environmental stimuli may spoil plot points or set the wrong mood and environment for the current section or portion of content currently being consumed. Please note that although FIG. 1 includes a first step and a second step, each step can occur simultaneously and not in any certain order.

The workflow 100 at step 1 includes the service provider computers 118 translating the metadata into appropriate application programming interface (API) calls at 124. In embodiments, the service provider computers 118 may be configured to generate other programmable instructions that are capable of communicating with devices 106-112 and cause interaction or activation of devices 106-112. The service provider computers 118 may translate the metadata into appropriate API calls for interacting with specific devices 106-112 and/or for activating or utilizing all or a portion of the device capabilities of devices 106-112 to provide environmental stimuli to the area around the user 102, such as within the user's wireless personal area network. In accordance with at least one embodiment, the service provider computers 118 may translate the metadata into one or more API calls or programmatic interface calls for a number of devices that may or may not be associated with a user's location. For example, the service provider computers 118 may provide mass programmatic interface calls for activating or otherwise interacting with user devices associated with an area around the user 102 absent identifying the particular devices (such as devices 106-112) in the area around the user 102. The workflow 100 at step 2 illustrates the service provider computers 118 invoking the API calls at 126, via networks 116, thereby causing devices 106-112 to activate or otherwise provide environmental stimuli to the user 102. In response to the service provider computers 118 invoking the APIs 126, the devices 106-112 may activate, change state, or cease to function to provide the environmental stimuli as defined in metadata at 122.

As illustrated in FIG. 1, the light device 106 may activate to provide a green hue (as illustrated as dashed lines 128) to the area around the user 102, the other light device 108 may dim the level of light previously provided (as illustrated as different dashed lines 130). Simultaneously or over a specific period or interval, speaker device 110 may begin playing a haunting noise (as illustrated by curved lines 132) and the smart thermostat device 112 may lower the temperature of the area (as illustrated by digital read-out 134). As described herein, the service provider computers 118 may return devices 106-112 to previous states prior to invoking different APIs than APIs 126. The service provider computers 118 may record or otherwise obtain an initial state of devices 106-112 prior to the user 102 using user device 104 to consume content or upon the user ceasing to consume the content. It should be noted that although the workflow of FIG. 1 illustrates the service provider computers 118 performing functions associated with the device synchronization features described herein, in some embodiments, a hub of devices 106-112 and/or user device 104 may be configured to perform similar functions.

Figure 2:
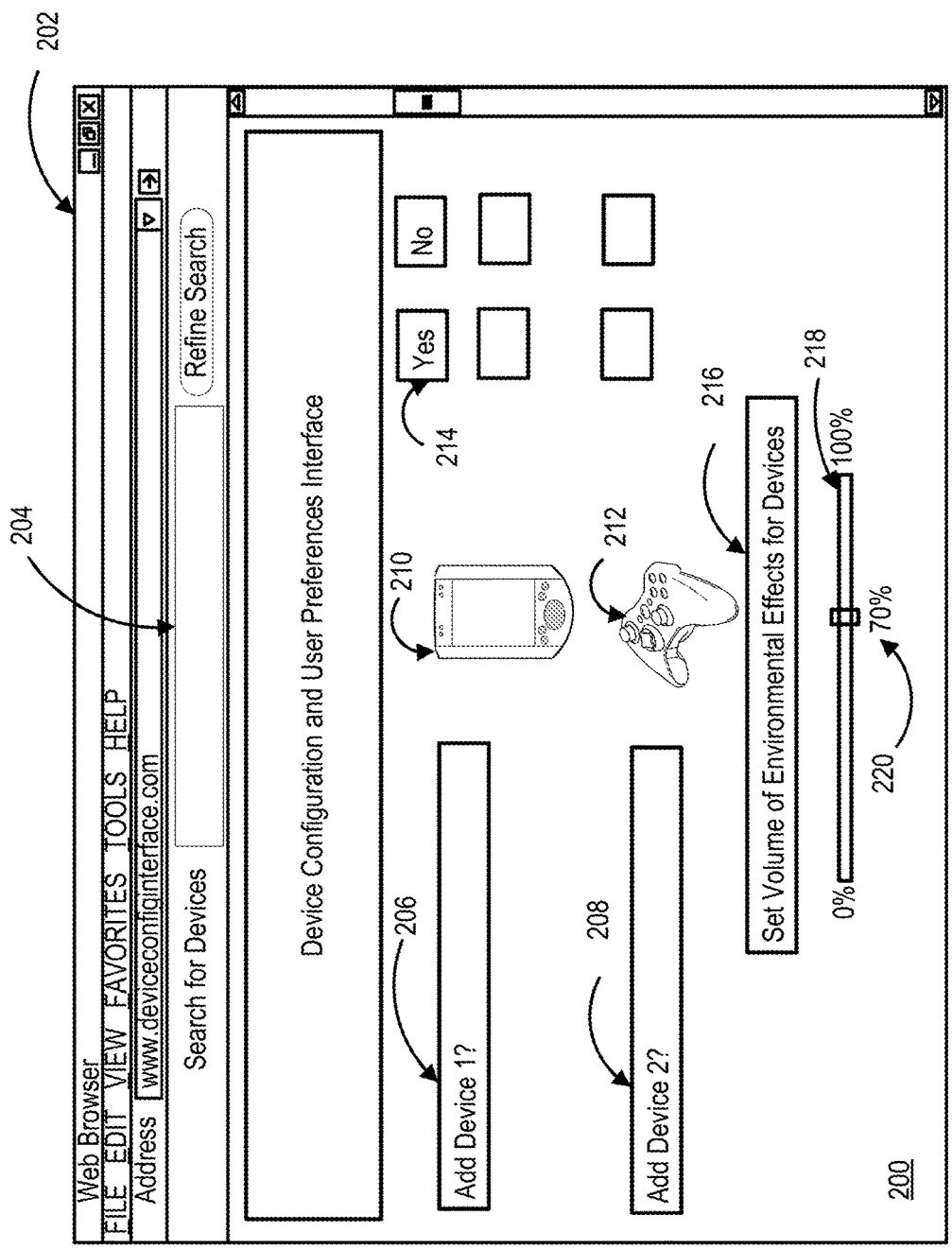
FIG. 2 illustrates an example user interface presented via a web browser for configuring devices to utilize with the device synchronization feature, in accordance with at least one embodiment.

FIG. 2 illustrates an example user interface presented via a web browser for configuring devices to utilize with the device synchronization feature, in accordance with at least one embodiment. FIG. 2 includes a user interface 200 presented by a web browser 202 for configuring devices associated with a user's location such as for a user's wireless personal area network and specifying preferences for environmental stimuli provided by said devices. The user interface 200 includes search functionality 204 for searching for local devices to add to the local network and set specifications for applied metadata. For example, the user interface 200 depicts queries 206 and 208 for adding device 1 (210 such as a portable computing device) and device 2 (212 such as a gaming device).

A user may interact with interactable objects 214 to provide permission for the device synchronization feature to utilize devices 210 and 212 to provide environmental stimuli to an area around the user based on metadata associated with a certain section or portion of content being consumed by the user. In accordance with at least one embodiment, the user may interact with user interface 200 to specify an overall volume or effectiveness of the environmental stimuli 216. For example, a status of available levels or volume for environmental stimuli 218 may be presented to the user as well as an indicator 220 for a current level or volume of environmental stimuli. The indicator 220 may be utilized by service provider computers to reduce or increase the effectiveness of the environmental stimuli as defined by the metadata. For example, an indicator 220 set at 100% may indicate that no adjustments are required to environmental stimuli levels defined by the metadata whereas an indicator 220 set at 70% would result in a 30% reduction in environmental stimuli levels as defined by the metadata. It should be noted that although the user interface 200 of FIG. 2 is displayed or presented by web browser 202, in embodiments a similar user interface may be displayed or presented to a user via a software application of a suitable computing device such as a native software application.

Figure 3:
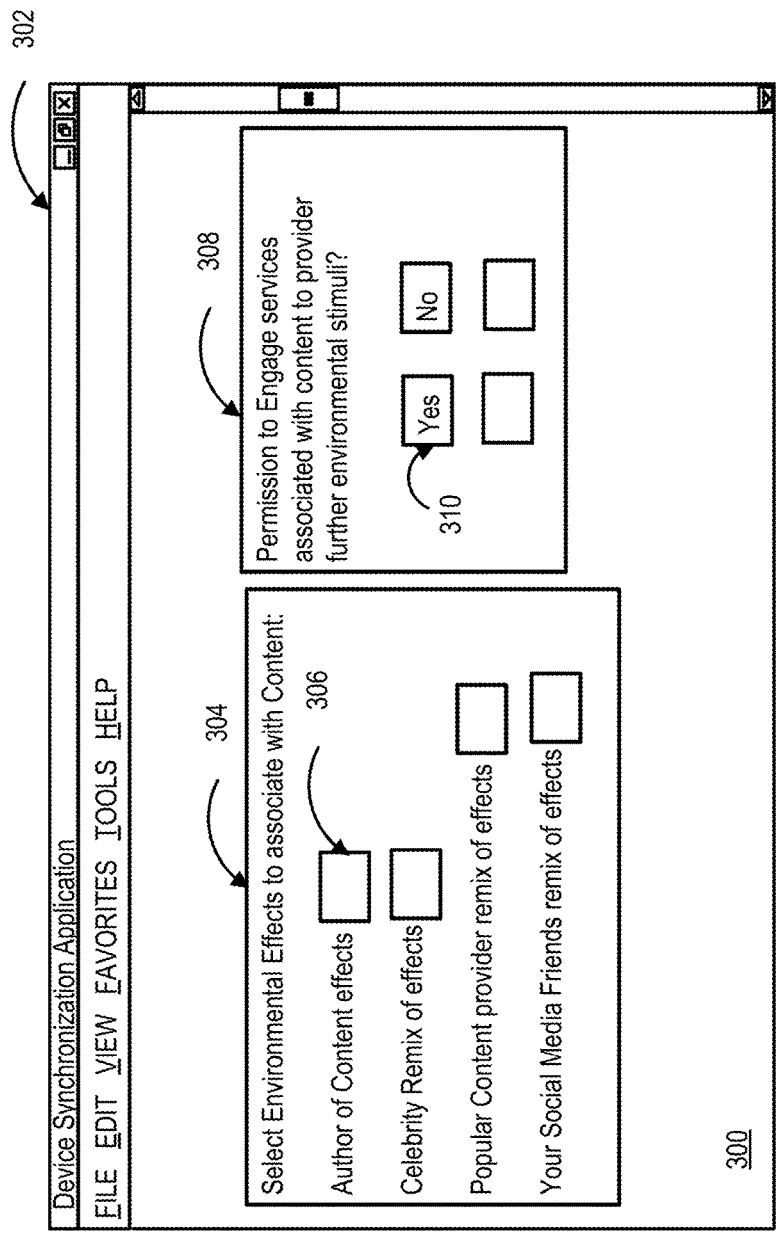
FIG. 3 illustrates an example user interface presented via an application for selecting environmental stimuli and setting user preferences for environmental stimuli, in accordance with at least one embodiment.

FIG. 3 illustrates an example user interface presented via an application for selecting environmental stimuli and setting user preferences for environmental stimuli, in accordance with at least one embodiment. FIG. 3 illustrates a user interface 300 that is presented or displayed by a device synchronization application 302 that may be generated by the service provider computers implementing the device synchronization features described herein. In embodiments, various entities may author or generate metadata sets to associate with certain content. A user may interact with user interface 300 to select which metadata set by which author the user wishes to experience when progressing through or consuming the content. For example, the user interface 300 includes environmental effects to associate with content selection object 304 with interactable objects 306 that enable the user to select which set of metadata by which author they would like applied to their content consumption experience. In embodiments, social media connections may be polled or queried to provide data regarding metadata sets for content prior to the user consuming the content. The user may be provided with a notification that includes information that identifies that a metadata set by a social media connection is available for use prior to consuming the content.

In accordance with at least one embodiment, the device synchronization feature may provide options to enable a user to provide permission to engage services to further supplemental the content consumption experience. For example, a character in a piece of content may be chased or followed by an autonomous vehicle such as a Roomba® or semi-autonomous vehicle such as a remote controlled vehicle. The service provider computers implementing the device synchronization feature may request permission from the user to have the autonomous or semi-autonomous vehicle follow them when they leave their current premises to further immerse the user in the content consumption experience. Other services may be engaged that deliver items such as food to the user as they progress through the content. The user interface 300 of FIG. 3 includes permission object 308 that also includes interactable objects 310 that enable the user to provide specific permission for potential services that are specified by the metadata for content. The permission may need to be provided prior to content consumption so as not to erroneously interrupt the user's content consumption experience.

Figure 4:
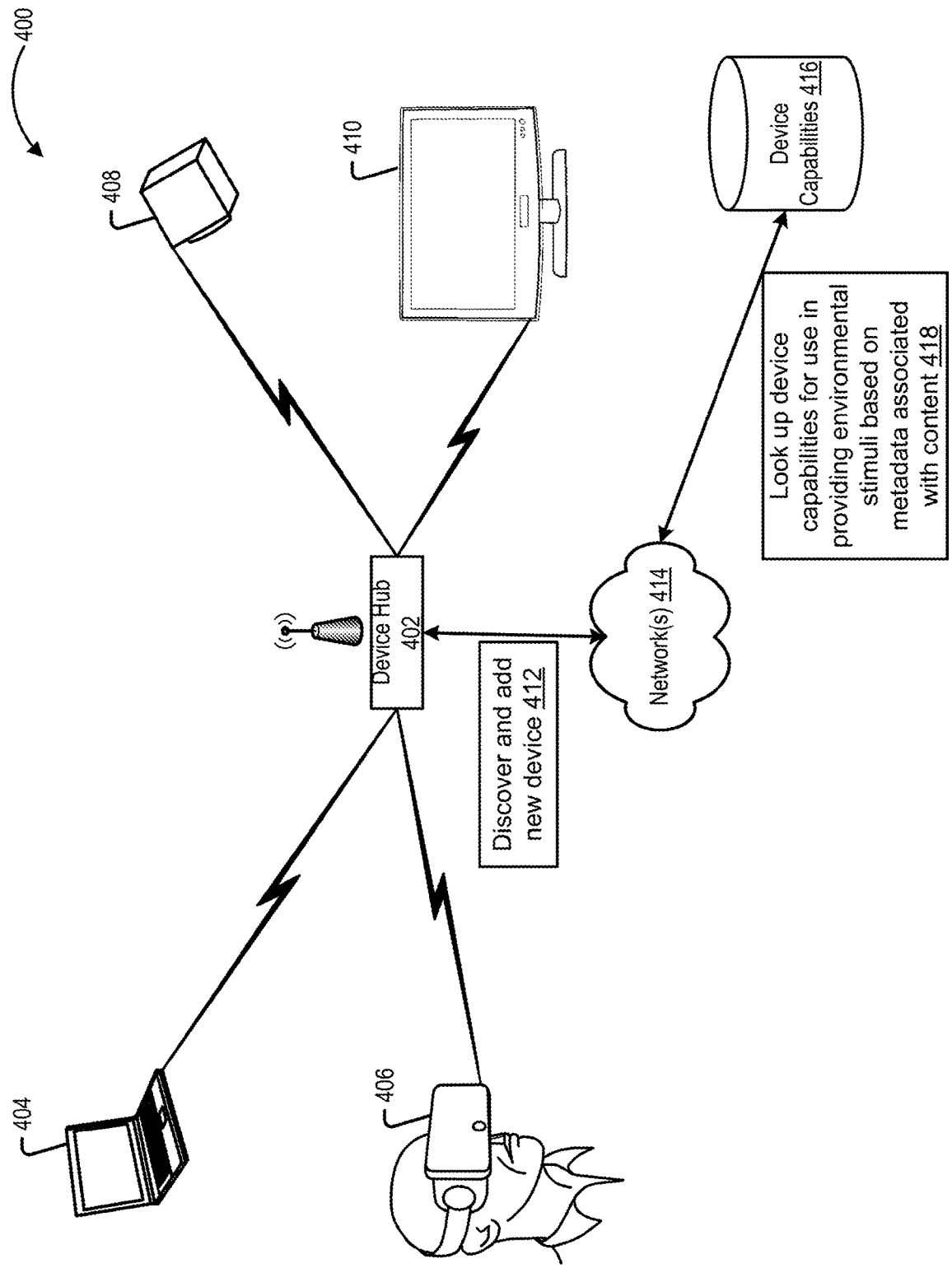
FIG. 4 illustrates an example workflow for discovering and adding devices with the device synchronization feature, in accordance with at least one embodiment.

FIG. 4 illustrates an example workflow for discovering and adding devices with the device synchronization feature, in accordance with at least one embodiment. The workflow 400 of FIG. 4 illustrates a device hub 402 (i.e., smart or IoT device hub) maintaining information about devices within an area around the device hub 402 such as devices 404-410. The device hub 402 may be configured to communicate with devices 404-410, provide a user interface to a user device such as a device being utilized by a user to consume content (portable computer device, video game device, e-book reader, mobile phone, smart television, etc.) that enables the user to add devices, remove devices, or specify other restrictions or preferences for devices. For example, the user may be associated with a smart thermostat that controls the temperature of a certain area. The user may provide rules that define limits for how high or how low the temperature should go no matter what the metadata associated with a piece of content may desire.

The workflow 400 also illustrates the device hub 402 discovering and attempting to add a new device at 412. For example, the user may have attempted to connect a new smart device to their wireless personal area network and/or interacted with a user interface provided by the synchronization feature that enables the user to add a new device. In response to the discovery of the new device, the device hub 402 may communicate, via networks 414, with a device capabilities database 416. As described herein, the synchronization feature service may maintain and update a device capabilities database 416 for use in looking up device capabilities for providing environmental stimuli to an area, such as by using devices 404-410 at 418. The device capabilities may define appropriate API calls for each device to enable the device hub 402 to invoke certain functions of each device 404-410 to create an environmental stimulus that enhances a user's content consumption experience. The device hub 402 may communicate with devices 404-410 via a wireless connection, a wired connection, a Bluetooth connection, a near field communication (NFC) communication, or other suitable communication protocol that enables the device hub 402 to interact and communicate with devices 404-410.

Figure 5:
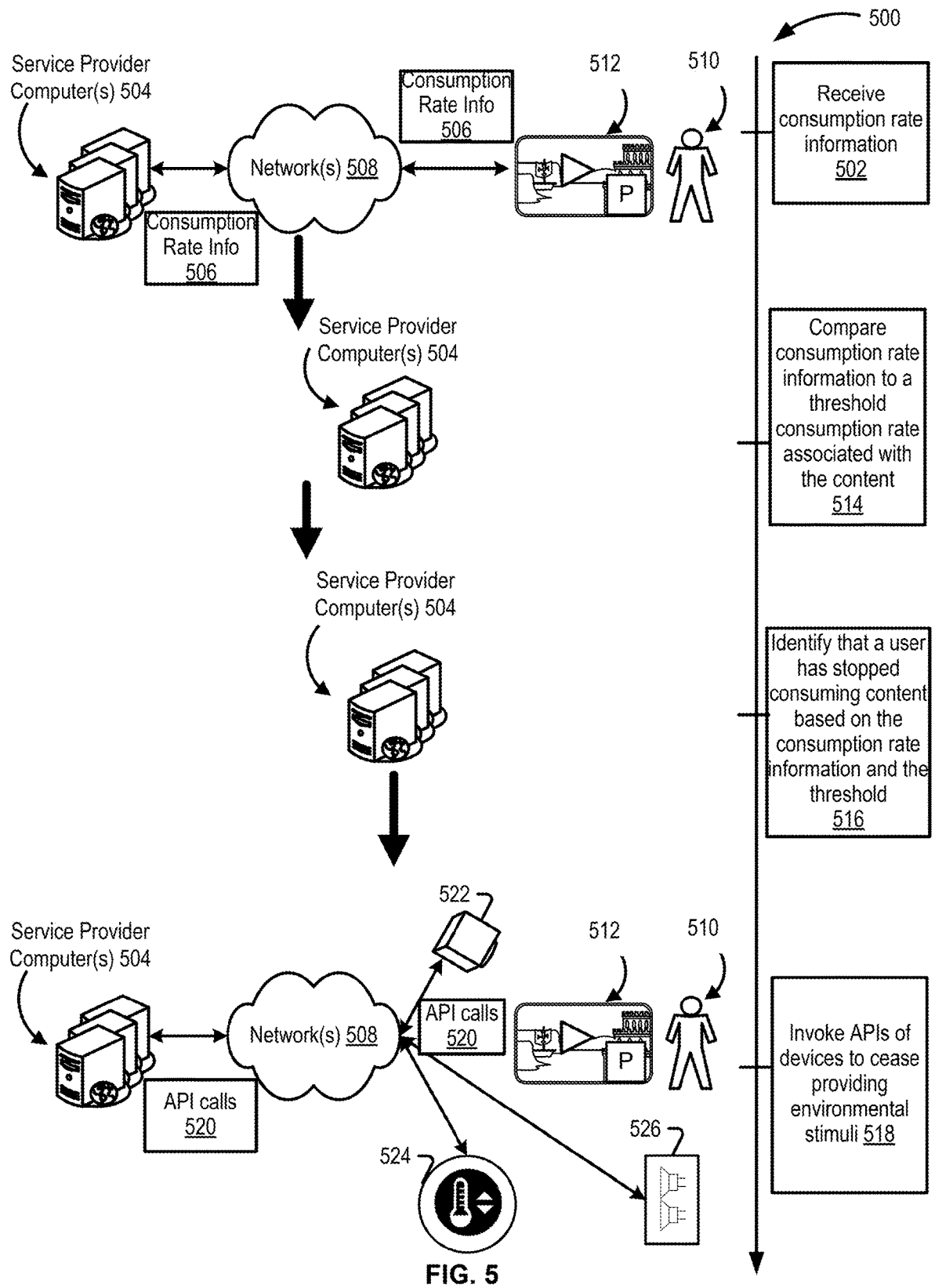
FIG. 5 illustrates an example workflow for a device synchronization feature, in accordance with at least one embodiment.

FIG. 5 illustrates an example workflow for a device synchronization feature, in accordance with at least one embodiment. The workflow 500 of FIG. 5 may include receiving consumption rate information at 502. For example, service provider computers 504 may receive consumption rate information 506 via networks 508 in response to a user 510 using a user device 512 to consume content. The consumption rate information 506 may be based on markers, tags, or other information associated with the content such as page numbers, time logs, or time stamps. In some embodiments, the consumption rate information 506 may be based on historical consumption rates obtained for the user 510 for certain content media types, such as a content consumption rate for books, movies, television shows, etc. In embodiments, the content consumption rate information may be determined based on the user interacting with the user device 512 or otherwise accessing or utilizing accessibility options of the device 512 or associated with the content itself like bonus features. Examples of consumption rate information 506 may include pages per hour for books or magazines, episode minutes or minutes per hour for movies, streaming content, etc.

The workflow 500 of FIG. 5 may include comparing the consumption rate information to a threshold consumption rate associated with the content at 514. In embodiments, the service provider computers 504 may maintain one or more thresholds of content consumption rates for use in determining an approximate range of when to invoke particular APIs to provide environmental stimuli. The one or more thresholds may also be utilized to determine when a user has stopped consuming the content to invoke APIs which cause connected devices to return to a previous state and thus stop providing the environmental stimuli. In embodiments, the one or more thresholds may be specified by the service provider computers 504, the author of the content, and/or the user 510. The workflow 500 of FIG. 5 may include identifying that a user has stopped consuming content based on the consumption rate information and the threshold at 516. Improvements on device synchronization can be achieved by dynamically determining when a user has stopped consuming the content rather than querying the user for when they have stopped or according to a pre-defined time limit such that devices can be returned to a previous state without interrupting or unnecessarily bothering the user. The workflow 500 of FIG. 5 may include invoking APIs of connected devices associated with the user to cease providing environmental stimuli at 518. For example, the service provider computers 504 may generate and invoke appropriate API calls 520 that are configured to interact with devices 522, 524, and 526 to cease providing previously provided environmental stimuli and thereby return devices 522-526 to a previous state which may be an inert state. In embodiments, the API calls may cause devices 522-526 to cease functioning or for functioning in a different capacity within its capabilities (e.g., emitting a normal white light as opposed to a blue light).

Figure 6:
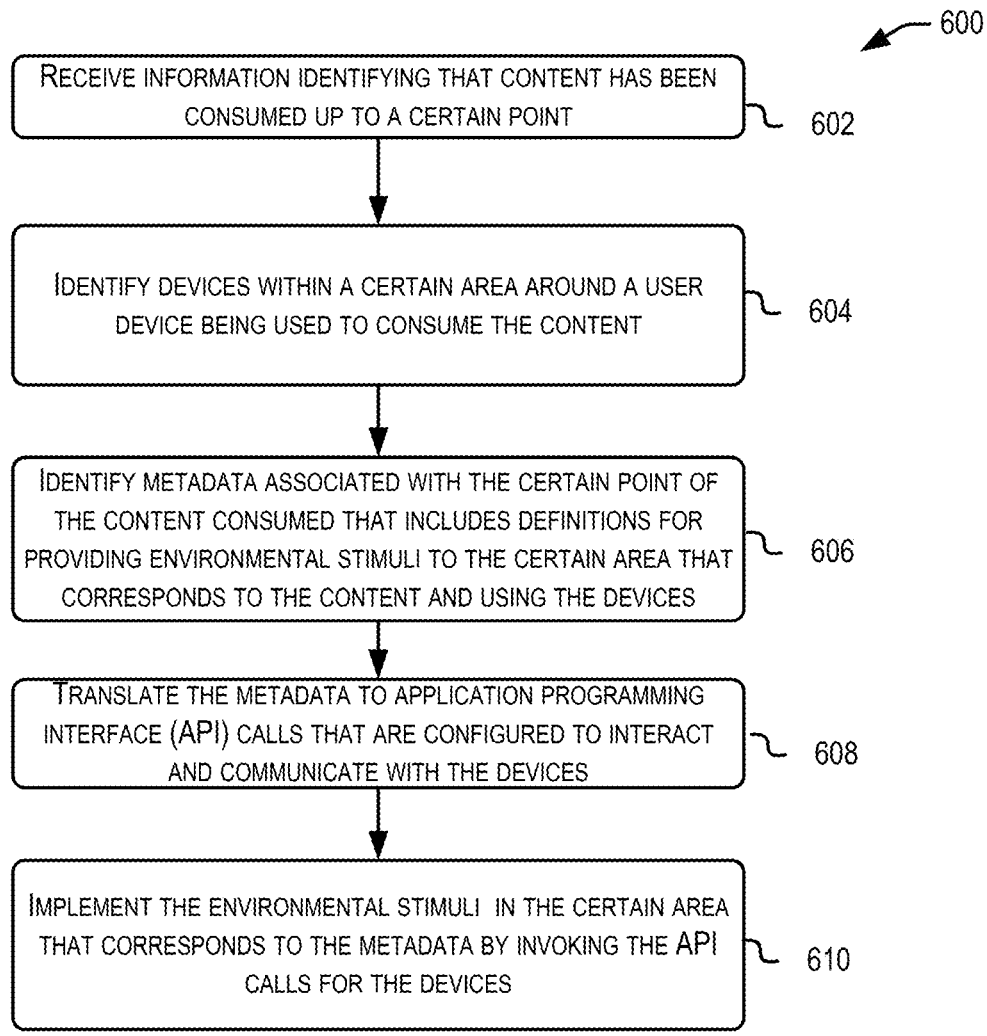
FIG. 6 illustrates an example flow chart for a device synchronization feature, in accordance with at least one embodiment.
Figure 7:
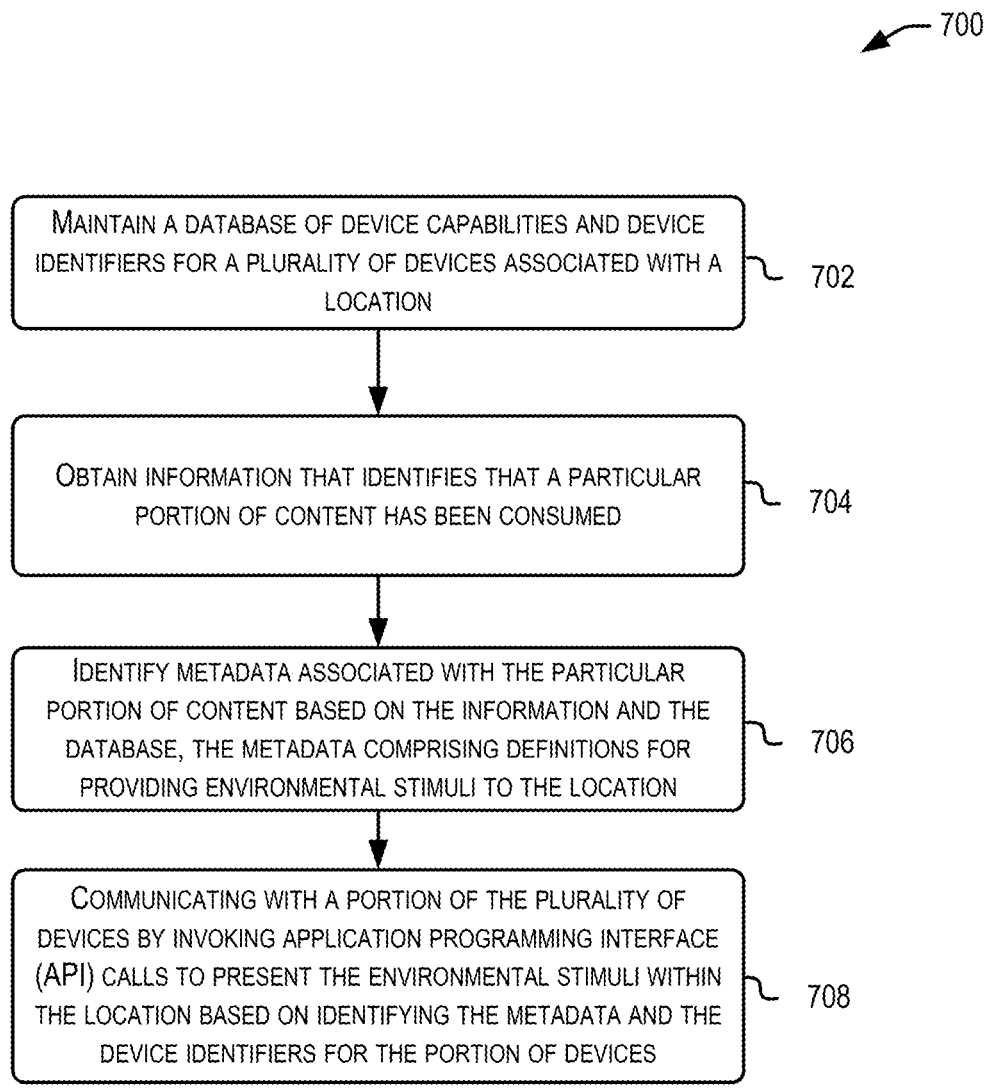
FIG. 7 illustrates an example flow chart for a device synchronization feature, in accordance with at least one embodiment.

FIGS. 6 and 7 illustrate example flow charts for a device synchronization feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 8:
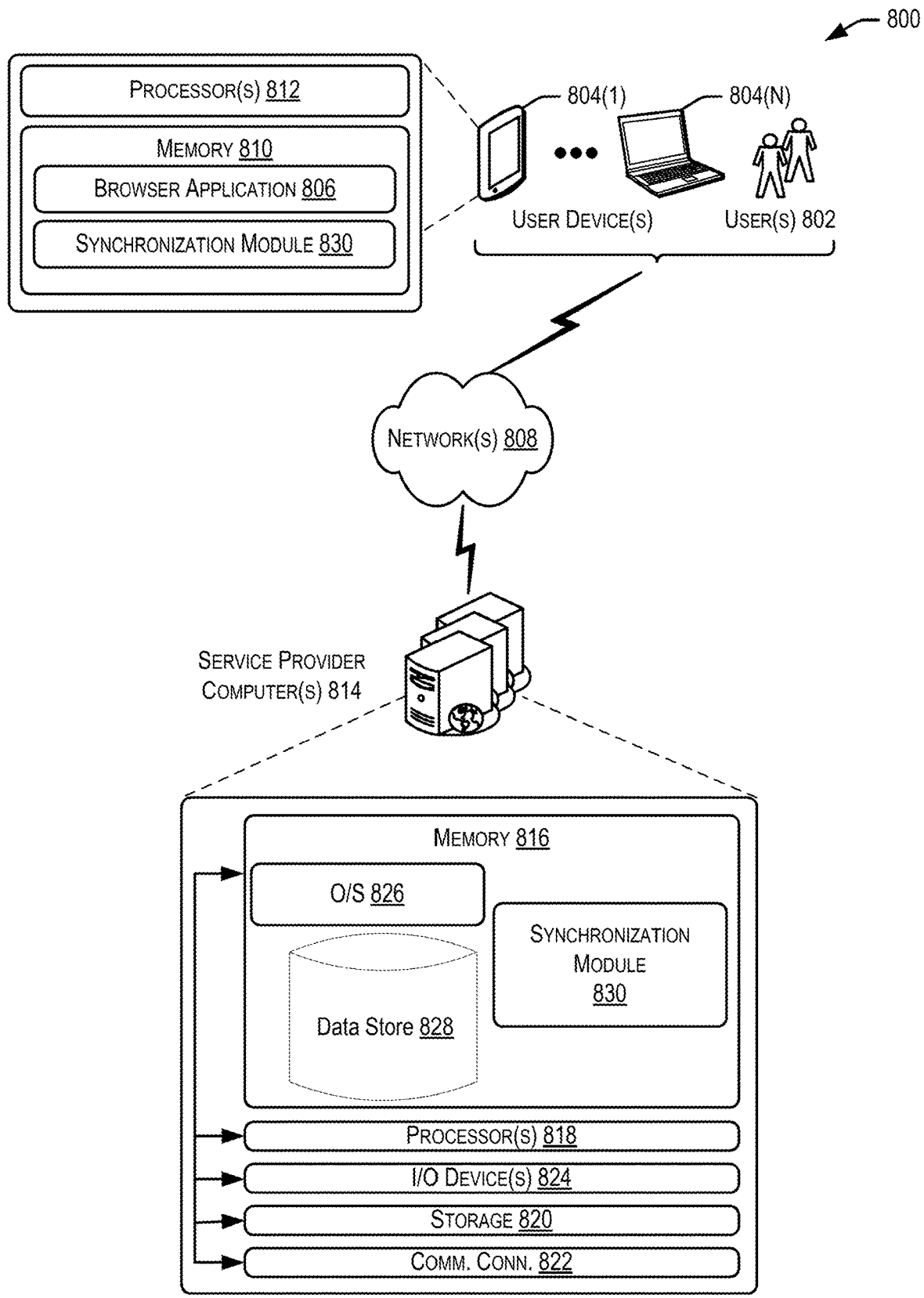
FIG. 8 illustrates an example architecture for implementing a device synchronization feature, in accordance with at least one embodiment.

In some examples, service provider computer (service provider computers 118, 504, and 814) utilizing at least the synchronization module 830 depicted in FIGS. 1, 5, and 8 may perform the processes 600 and 700 of FIGS. 6 and 7. In FIG. 6, the process 600 may include receiving information identifying that content has been consumed up to a certain point at 602. As described herein, certain portions of the content may be associated with metadata that defines environmental stimuli that should be provided by smart or connected devices around the user to enhance the user's content consumption experience. In embodiments, an author can provide specifications or definitions that are represented by the metadata for the portion of content. For example, for a character that is running through a jungle, the author may define metadata that calls for an increase in temperature and the playing of sounds of swarms of bugs and other reptiles all around the user as the user consumes the content. In accordance with at least one embodiment, an author or other entity may define multiple levels of environmental stimuli for certain portions of a piece of content. For example, a primary level of metadata may include general definitions such as make the room colder or hotter based on available devices, whereas a secondary or other level of metadata may include specific definitions such as a ten degree drop in temperature using all available smart thermostats. Authors or other entities that define metadata for content can provide varied levels of metadata that can be utilized when certain smart or connected devices are available. For example, a certain set of metadata may be selected by the synchronization feature based on a combination of certain smart or connected devices otherwise another certain set of metadata may be selected that is more appropriate for the available devices included in a user's wireless personal area network.

The process 600 may include identifying devices within a certain area around a user device being used to consume the content at 604. In embodiments, a hub of IoT devices, a user device consuming the content or the service provider computer may attempt to identify available smart or connected devices within a user's immediate area or wireless personal area network. For example, identification pings may be provided to devices that were previously registered or utilized by the user within the area or previously connected to the hub or user device. In some embodiments, a user may provide input prior to consuming the content that identifies devices that should be utilized to provide the environmental stimuli. The process 600 may include identifying metadata associated with the certain point of the content consumed that includes definitions for providing environmental stimuli to the certain area that corresponds to the content and using the identified devices at 606. In accordance with at least one embodiment, the metadata may include definitions for providing environmental stimuli that is appropriate for the certain point of content consumed by the user. For example, if a character in a movie is in a hospital, the metadata may include directions for providing a heart rate monitor sound. The metadata may be selected by the synchronization feature as implemented by the service provider computer, hub, or user device based on the type and number of identified devices as well as the certain point of content consumed so as to enhance the user's content consumption experience.

In embodiments, the metadata may also include definitions for use in transitioning between devices or capabilities of a single device to cause a smooth transition or a quick transition between environmental stimuli thus creating an overall stimulus that the author deemed appropriate for the certain portion of content consumed by the user. The process 600 may include translating the metadata to application programming interface (API) calls that are configured to interact and communicate with the devices at 608. In embodiments, the service provider computer, hub, and/or user device may utilize the metadata to generate one or more API calls or other programmable communication instructions for communicating and interacting with the identified devices within the area, location, or wireless personal area network associated with the user to provide the environmental stimuli. For example, the metadata specifying that the room should have the temperature reduced may be translated into API calls for a smart thermostat that causes the thermostat and thereby an associated air conditioner to lower the temperature of the room. The process 600 may conclude at 610 by implementing the environmental stimuli in the certain area that corresponds to the metadata by invoking the API calls for the devices. As described herein, the API calls may be invoked at certain intervals or in a certain order to create a general environmental stimulus (e.g., reduce the temperature, cause a slow transition to emit blue light in the room), a transition of the environment (e.g., a subtle transition of the color of the room to orange with periodic howling wind noises from speakers that takes five minutes to implement), or to generate a fast and erratic environment (e.g., such as flashing lights and loud noises in quick succession).

In FIG. 7, the process 700 may include maintaining a database of device capabilities and device identifiers for a plurality of devices associated with a location at 702. The device capabilities may be pre-defined by the manufacturer of the device or requested by the manufacturer of the device. As new connected and smart devices are created and released to the consuming public, a user may add the new device to their connected devices and metadata may be generated by authors of content that utilize the new devices. The database may be updated accordingly such that the new devices may be utilized to provide environmental stimuli to an area associated with the user according to metadata provided by an entity for the content. As described herein, a user may interact with a user interface of an application or web browser to add or remove devices that may be utilized to provide the environmental stimuli. The process 700 may include obtaining information that identifies that a particular portion of content has been consumed at 704. In embodiments, the information may be associated with markers, tags, or other user accessibility options of the content that can be used to determine how far a user has progressed through the content (which portion of content has been consumed). Information associated with the content itself can be utilized to determine or identify how far the user has progressed through the content such as page numbers or time logs that correspond to the content being consumed.

The process 700 may include identifying metadata associated with the particular portion of content based on the information and the database where the metadata comprises definitions for providing environmental stimuli to the location at 706. In some embodiments, the metadata may define environmental stimuli that require only a portion of devices capabilities to implement while other metadata may define environmental stimuli that requires a devices complete capabilities to implement. The process 700 may conclude at 708 by communicating with a portion of the plurality of devices by invoking API calls to present the environmental stimuli within the location based on identifying the metadata and the device identifiers for the portion of devices. In embodiments, a hub of IoT devices, a user device, or the service provider computers may utilize the device identifiers to provide the appropriate API calls that result in the correct devices activating to provide environmental stimuli to the location that enhances the user's content consumption experience as defined by the metadata.

FIG. 8 illustrates an example architecture for implementing a device synchronization feature, in accordance with at least one embodiment. In architecture 800, one or more users 802 (e.g., customers, users, consumers, etc.) may utilize user computing devices 804(1)-(N) (collectively, user devices 804) to access a browser application 806 or a user interface (UI) accessible through the browser application 806, via one or more networks 808 to request and consume content, provide indications of portions of content consumed, identify user devices 804 within an certain area around the user 802 or user devices 804, determine appropriate metadata for the content and invoke API calls or other programmable language communications to activate or interact with user devices 804 to provide environmental stimuli as described herein. The "browser application" 806 can be any browser control or native application that can access and display a network page or other information such as a user interface of a native software application for enabling the consumption of content as well as specifying user preferences for environmental stimuli, selecting appropriate devices to provide said stimuli, and selecting particular metadata sets associated with a piece of content. A native software application may include an application or program that has been developed for use on a particular platform (such as an operating system) or a particular device (such as a particular type of mobile device or user device 804). In embodiments, the user device 804 may include one or more components for enabling the user 802 to interact with the browser application 806. In embodiments, the user device 804 may include a hub or other device manager that is configured to identify, access, and communicate with other user devices for providing the environmental stimuli.

The user devices 804 may include at least one memory 810 and one or more processing units or processor(s) 812. The memory 810 may store program instructions that are loadable and executable on the processor(s) 812, as well as data generated during the execution of these programs. Depending on the configuration and type of the user devices 804, the memory 810 may be volatile (such as random access memory (RAM)) and/or non-volatile (such as read-only memory (ROM), flash memory, etc.). The user devices 804 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 804. In some implementations, the memory 810 may include multiple different types of memory, such as static random access memory (SRAM), dynamic random access memory (DRAM), or ROM.

Turning to the contents of the memory 810 in more detail, the memory 810 may include an operating system and one or more application programs or services for implementing the features disclosed herein. Additionally, the memory 810 may include one or more modules for implementing the features described herein including the synchronization module 830.

The architecture 800 may also include one or more service provider computers 814 that may, in some examples, provide computing resources such as, but not limited to, client entities, low latency data storage, durable data store, data access, management, virtualization, hosted computing environment or "cloud-based" solutions, electronic content performance management, etc. The service provider computers 814 may implement or be an example of the service provider computer(s) 118 or 504 of FIGS. 1 and 5. The one or more service provider computers 814 may also be operable to provide site hosting, computer application development, and/or implementation platforms, combinations of the foregoing, or the like to the one or more users 802.

In some examples, the networks 808 may include any one or a combination of many different types of networks, such as cable networks, the Internet, wireless networks, cellular networks, and other private and/or public networks. While the illustrated examples represents the users 802 communicating with the service provider computers 814 over the networks 808, the described techniques may equally apply in instances where the users 802 interact with the one or more service provider computers 814 via the one or more user devices 804 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 814 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 814 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 814 may be in communication with the user device 804 via the networks 808, or via other network connections. The one or more service provider computers 814 may include one or more servers, perhaps arranged in a cluster or as individual servers not associated with one another.

In one illustrative configuration, the one or more service provider computers 814 may include at least one memory 816 and one or more processing units or processor(s) 818. The processor(s) 818 may be implemented as appropriate in hardware, computer-executable instructions, firmware, or combination thereof. Computer-executable instruction or firmware implementations of the processor(s) 818 may include computer-executable or machine-executable instructions written in any suitable programming language to perform the various functions described when executed by a hardware computing device, such as a processor. The memory 816 may store program instructions that are loadable and executable on the processor(s) 818, as well as data generated during the execution of these programs. Depending on the configuration and type of the one or more service provider computers 814, the memory 816 may be volatile (such as RAM) and/or non-volatile (such as ROM, flash memory, etc.). The one or more service provider computers 814 or servers may also include additional storage 820, which may include removable storage and/or non-removable storage. The additional storage 820 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 816 may include multiple different types of memory, such as SRAM, DRAM, or ROM.

The memory 816, the additional storage 820, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 816 and the additional storage 820 are all examples of non-transitory computer storage media. Additional types of non-transitory computer storage media that may be present in the one or more service provider computers 814 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 814. Combinations of any of the above should also be included within the scope of non-transitory computer-readable media.

The one or more service provider computers 814 may also contain communication connection interface(s) 822 that allow the one or more service provider computers 814 to communicate with a data store, another computing device or server, user terminals, and/or other devices on the networks 808. The one or more service provider computers 814 may also include I/O device(s) 824, such as a keyboard, a mouse, a pen, a voice input device, a touch input device, a display, speakers, a printer, etc.

Turning to the contents of the memory 816 in more detail, the memory 816 may include an operating system 826, one or more data stores 828, and/or one or more application programs or services for implementing the features disclosed herein including the synchronization module 830. In accordance with at least one embodiment, the synchronization module 830 may be configured to at least receive and process indications of portions of content consumed, identify user devices 804 within an certain area around the user 802 or user devices 804 (such as adding or removing devices from a wireless personal area network), determine appropriate metadata for the content based on the portion of content consumed and the available devices, and invoke API calls or other programmable language communications to activate or interact with user devices 804 to provide environmental stimuli that corresponds to the portion of consumed content and the metadata provided by an entity for the portion of consumed content.

Figure 9:
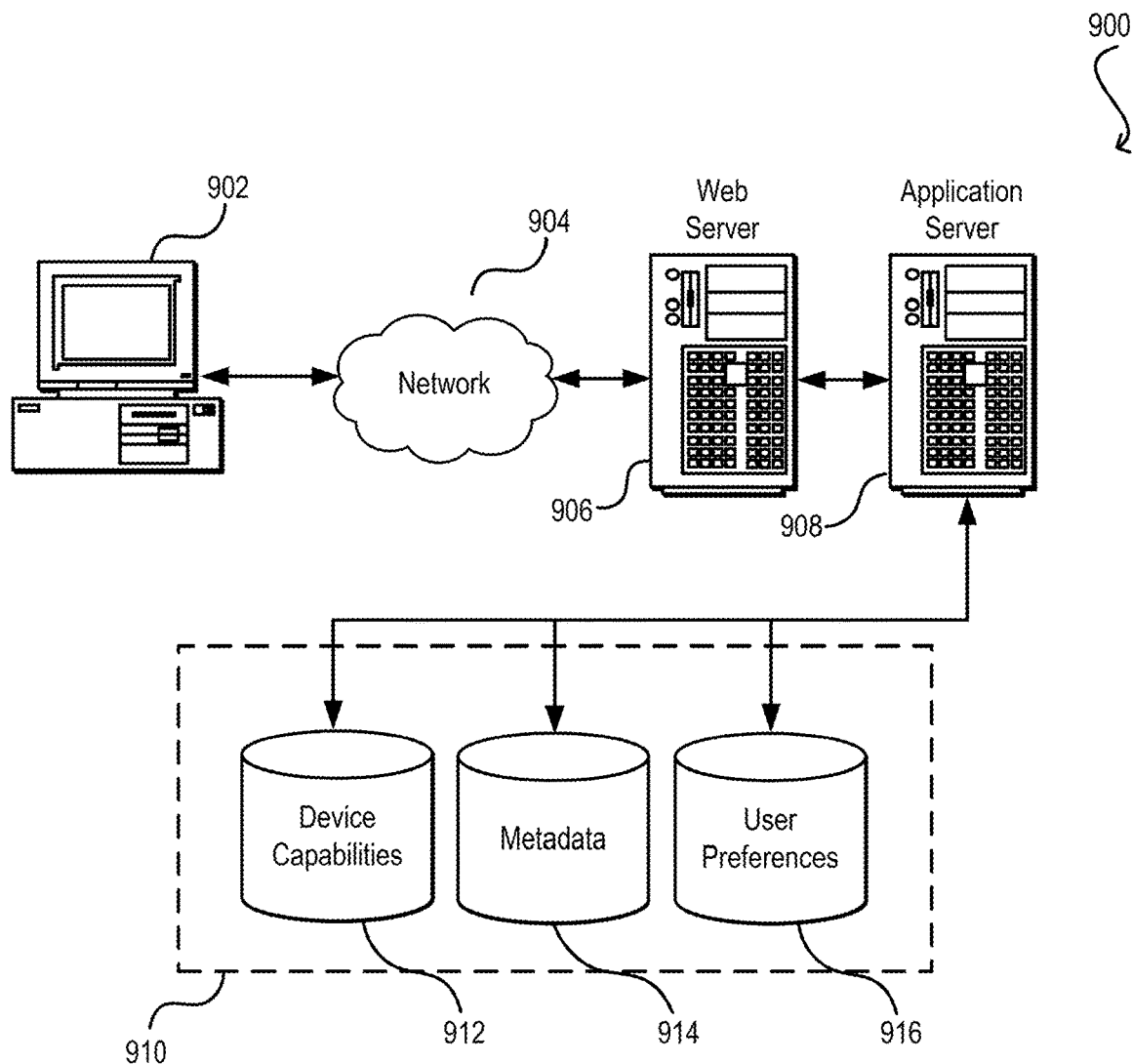
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing device capabilities 912 and user preferences 916, which can be used to serve content for the production side as well as identify device capabilities of connected devices within a certain area associated with the user consuming content and applying an overall reduction or increase to environmental stimuli as defined by the metadata and implemented by said devices according to the user preferences. The data store also is shown to include a mechanism for storing metadata 914, which can be used for reporting, analysis, or other such purposes such as defining environmental stimuli associated with certain portions of a piece of content that can be translated into API calls or other programmable device communications to activate or otherwise interact with a smart or connected device to provide the environmental stimuli. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system and from a user device, information identifying consumption of a portion of content presented by the user device;
   identifying, by the computer system, one or more devices within a certain area around the user device, a device of the one or more devices configured to provide a utilitarian function;
   identifying, by the computer system, metadata associated with the content and the portion of the content based at least in part on the information and the identified one or more devices within the certain area, the metadata comprising definitions for generating environmental stimuli to the certain area that correspond to the portion of the content using the one or more devices, and wherein the metadata is specified by a third party that represents a reinterpretation of original metadata associated with the portion of content;
   translating, by the computer system, the metadata to application programming interface (API) calls that are configured to communicate and interact with the one or more devices to activate the utilitarian function corresponding to the device of the one or more devices; and
   implementing, by the computer system, the environmental stimuli in the certain area that corresponds to the metadata by invoking the API calls for the one or more devices based at least in part on the information.

2. The computer-implemented method of claim 1, further comprising determining an order of activation for the one or more devices based at least in part on the metadata, wherein invoking the API calls for the one or more devices is further based at least in part on the order of activation.

3. The computer-implemented method of claim 1, wherein translating the metadata to the API calls is based at least in part on device capabilities associated with each device of the one or more devices.

4. The computer-implemented method of claim 1, wherein the metadata is specified by an author associated with the content.

5. A non-transitory computer-readable storage medium storing computer-executable instructions that, when executed by a computer system, configure the computer system to perform operations comprising:
   maintaining a database of device capabilities and device identifiers for a plurality of devices associated with a location;
   obtaining, from a user device, information that identifies that a particular portion of content has been consumed, the content being presented by the user device;
   identifying metadata associated with the particular portion of content based at least in part on the information and the database, the metadata comprising definitions for providing environmental stimuli to the location, the environmental stimuli corresponding to the particular portion of content, and wherein the metadata is specified by a third party that represents a reinterpretation of original metadata associated with the particular portion of content specified by an author of the content; and
   communicating with a portion of devices of the plurality of devices by invoking programmatic interface calls to present the environmental stimuli within the location that corresponds to the particular portion of content based at least in part on identifying the metadata and the device identifiers for the portion of devices.

6. The non-transitory computer-readable storage medium of claim 5, wherein the computer-executable instructions when executed by the computer system further perform operations comprising modifying the presentation of the environmental stimuli within the location based at least in part on user input, the user associated with the user device.

7. The non-transitory computer-readable storage medium of claim 5, wherein the computer-executable instructions when executed by the computer system further perform operations comprising selecting the portion of devices of the plurality of devices based at least in part on input provided by a user associated with the user device.

8. The non-transitory computer-readable storage medium of claim 5, wherein invoking the programmatic interface calls to present the environmental stimuli includes using a portion of each device's complete device capabilities based at least in part on input provided by a user associated with the user device.

9. The non-transitory computer-readable storage medium of claim 5, wherein the metadata further comprises a first level of definitions for providing a first set of environmental stimuli to the location based at least in part on a first number of devices associated with the location and a second level of definitions for providing a second set of environmental stimuli to the location based at least in part on a second number of devices associated with the location.

10. The non-transitory computer-readable storage medium of claim 5, wherein the computer-executable instructions when executed by the computer system further perform operations comprising updating the database of device capabilities and the device identifiers based at least in part on a user associated with the user device interacting with a user interface to provide device information associated with a new device for the location.

11. The non-transitory computer-readable storage medium of claim 5, wherein the computer-executable instructions when executed by the computer system further perform operations comprising receiving, from a user interface implemented by the user device, user preferences that indicate a selection of a portion of the environmental stimuli defined by the metadata, the user preferences received prior to the user consuming the content presented by the user device.

12. The non-transitory computer-readable storage medium of claim 5, wherein the metadata further comprises instructions for invoking a service provided by the third party that corresponds to the environmental stimuli corresponding to the particular portion of content.

13. A computer system comprising:
   a memory configured to store computer-executable instructions; and
   a processor in communication with the memory configured to execute the computer-executable instructions to at least:

obtain an indication that a consumption event has occurred with respect to a certain portion of content, the content being presented by the computer system via a user interface;

select metadata associated with the certain portion of content based at least in part on the indication, the metadata specified by a third party that represents a reinterpretation of original metadata associated with the certain portion of content; and invoke programmatic interface calls that are configured to communicate with one or more devices to present environmental stimuli to a region containing the computer system based at least in part on the selected metadata, the presentation of the environmental stimuli comprising utilizing one or more stimuli presentation functions associated with a device of the one or more devices.

14. The computer system of claim 13, wherein the processor is further configured to determine that a user has ceased to consume the content based at least in part on input from the user interacting with the user interface.

15. The computer system of claim 14, wherein the processor is further configured to cease presentation of the environmental stimuli to the region based at least in part on the input.

16. The computer system of claim 13, wherein the processor is further configured to cease presentation of the environmental stimuli to the region based at least in part on a consumption rate of the content and a threshold consumption rate associated with the content.

17. The computer system of claim 13, wherein the processor is further configured to:

request input from a user, via the user interface, about a consumption rate of the content; and cease presentation of the environmental stimuli to the region based at least in part on a lack of the input from the user via the user interface.

18. The computer system of claim 13, wherein the processor is further configured to determine an amount of the content consumed based at least in part on markers associated with the content, the markers configured to communicate that the certain portion of the content has been consumed.

19. The computer system of claim 13, wherein the processor is further configured to determine an amount of the content consumed based at least in part on information that identifies that a user has utilized a device function of the computer system to interact with the content.

* * * * *